United States Patent
Tsugita et al.

(10) Patent No.: US 10,756,944 B2
(45) Date of Patent: Aug. 25, 2020

(54) INFORMATION PROCESSING APPARATUS AND INFORMATION PROCESSING METHOD

(71) Applicant: FUJITSU LIMITED, Kawasaki-shi, Kanagawa (JP)

(72) Inventors: Yusuke Tsugita, Yokohama (JP); Masayoshi Utaka, Yokohama (JP); Naoki Akiyama, Kawasaki (JP); Eiji Morito, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 239 days.

(21) Appl. No.: 15/864,024

(22) Filed: Jan. 8, 2018

(65) Prior Publication Data

US 2018/0205594 A1 Jul. 19, 2018

(30) Foreign Application Priority Data

Jan. 16, 2017 (JP) ................................. 2017-004938

(51) Int. Cl.
*H04L 12/24* (2006.01)

(52) U.S. Cl.
CPC ...... *H04L 41/0213* (2013.01); *H04L 41/0813* (2013.01); *H04L 41/0853* (2013.01)

(58) Field of Classification Search
None
See application file for complete search history.

(56) References Cited

U.S. PATENT DOCUMENTS

2011/0302442 A1* 12/2011 Garrett ................ G06Q 20/10
713/400
2012/0117226 A1 5/2012 Tanaka et al.

FOREIGN PATENT DOCUMENTS

| JP | 2010-262545 | 11/2010 |
| JP | 2012-099048 | 5/2012 |
| JP | 2013-206368 | 10/2013 |
| JP | 2014-126940 | 7/2014 |

\* cited by examiner

*Primary Examiner* — Esther B. Henderson
(74) *Attorney, Agent, or Firm* — Fujitsu Patent Center

(57) ABSTRACT

An information processing apparatus includes a memory and a processor coupled to the memory and configured to, receive a plurality of pieces of collation information corresponding to respective information items of configuration information representing information apparatus configurations, perform collation processing for collating information acquired from an information system including a plurality of information apparatuses with the plurality of pieces of collation information, and specify pieces of configuration information representing respective configurations of the plurality of information apparatuses based on specific collation information with which the largest number of successes of the collation processing for each type of information item and each model of information apparatus is detected.

11 Claims, 12 Drawing Sheets

| COLLATION INFORMATION TABLE | | | REGULAR EXPRESSION |
|---|---|---|---|
| DEFINITION ID | ITEM | KEYWORD | PATTERN |
| 1 | MODEL NAME | PRIMERGY | RX\{3}S\d{1} |
| 2 | MODEL NAME | PRIMERGY | BX\{3}S\d{1} |
| 3 | IP ADDRESS | IP | \d{1,3}\.\d{1,3}\.\d{1,3}\.\d{1,3} |
| 4 | IP ADDRESS | Ipaddr | \d{1,3}\.\d{1,3}\.\d{1,3}\.\d{1,3} |
| 5 | IP ADDRESS | Ipaddress | \d{1,3}\.\d{1,3}\.\d{1,3}\.\d{1,3} |
| 6 | SERIAL NUMBER | Serial Num | [0-9A-Z]{12} |
| 7 | SERIAL NUMBER | Serial Number | [0-9A-Z]{12} |

FIG. 4

| DETECTION RESULT TABLE | | |
|---|---|---|
| RESOURCE ID | DEFINITION ID | VALUE |
| 1 | 1 | RX300S2 |
| 1 | 3 | 192.168.1.1 |
| 1 | 5 | 192.168.1.10 |
| 1 | 6 | AA1234567890 |

FIG. 5

| DETECTION COUNT TABLE | | |
|---|---|---|
| MODEL DEFINITION ID | DEFINITION ID | DETECTION COUNT |
| 1 | 3 | 33 |
| 1 | 4 | 21 |
| 1 | 5 | 20 |
| 1 | 6 | 0 |
| 1 | 7 | 5 |
| 2 | 3 | 66 |
| 2 | 4 | 2 |
| 2 | 5 | 8 |
| 2 | 6 | 19 |
| 2 | 7 | 1 |

FIG. 6

| SERVER RELATIONSHIP TABLE | |
|---|---|
| PHYSICAL SERVER RESOURCE ID | VERTUAL SERVER RESOURCE ID |
| 1 | 2 |
| 1 | 3 |

FIG. 7

| CONFIGURATION INFORMATION TABLE | | | | |
|---|---|---|---|---|
| RESOURCE ID | MODEL NAME | IP ADDRESS | SERIAL NUMBER | ... |
| 1 | RX300S2 | 192.168.1.1 | AA1234567890 | |
| 2 | PT3000 | 192.168.1.2 | BB1234567890 | |
| 3 | HD64S1 | 192.168.1.3 | CC1234567890 | |

INFORMATION PROCESSING APPARATUS AND INFORMATION PROCESSING METHOD

CROSS-REFERENCE TO RELATED APPLICATION

This application is based upon and claims the benefit of priority of the prior Japanese Patent Application No. 2017-4938, filed on Jan. 16, 2017, the entire contents of which are incorporated herein by reference.

FIELD

The embodiment discussed herein is related to an information processing apparatus, an information processing method for managing an information system.

BACKGROUND

In data centers and the like, an information system sometimes includes a plurality of types of information processing apparatuses, information apparatuses, and the like provided by a plurality of manufacturers and vendors. The administrator of such an information system performs configuration management to understand what types of information processing apparatuses or information apparatuses are used in combination.

For example, Japanese Laid-open Patent Publication Nos. 2013-206368, 2012-99048, 2014-126940, and 2010-262545 disclose related arts.

SUMMARY

According to an aspect of the invention, an information processing apparatus includes a memory and a processor coupled to the memory and configured to, receive a plurality of pieces of collation information corresponding to respective information items of configuration information representing information apparatus configurations, perform collation processing for collating information acquired from an information system including a plurality of information apparatuses with the plurality of pieces of collation information, and specify pieces of configuration information representing respective configurations of the plurality of information apparatuses based on specific collation information with which the largest number of successes of the collation processing for each type of information item and each model of information apparatus is detected.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating data in a detection result table stored in the catalog DB;

FIG. 5 is a diagram illustrating data in a detection count table stored in the catalog DB;

FIG. 6 is a diagram illustrating data in a server relationship table in a configuration management database (CMDB);

FIG. 7 is a diagram illustrating data in a configuration information table in the CMDB;

DESCRIPTION OF EMBODIMENT

Figure 1:
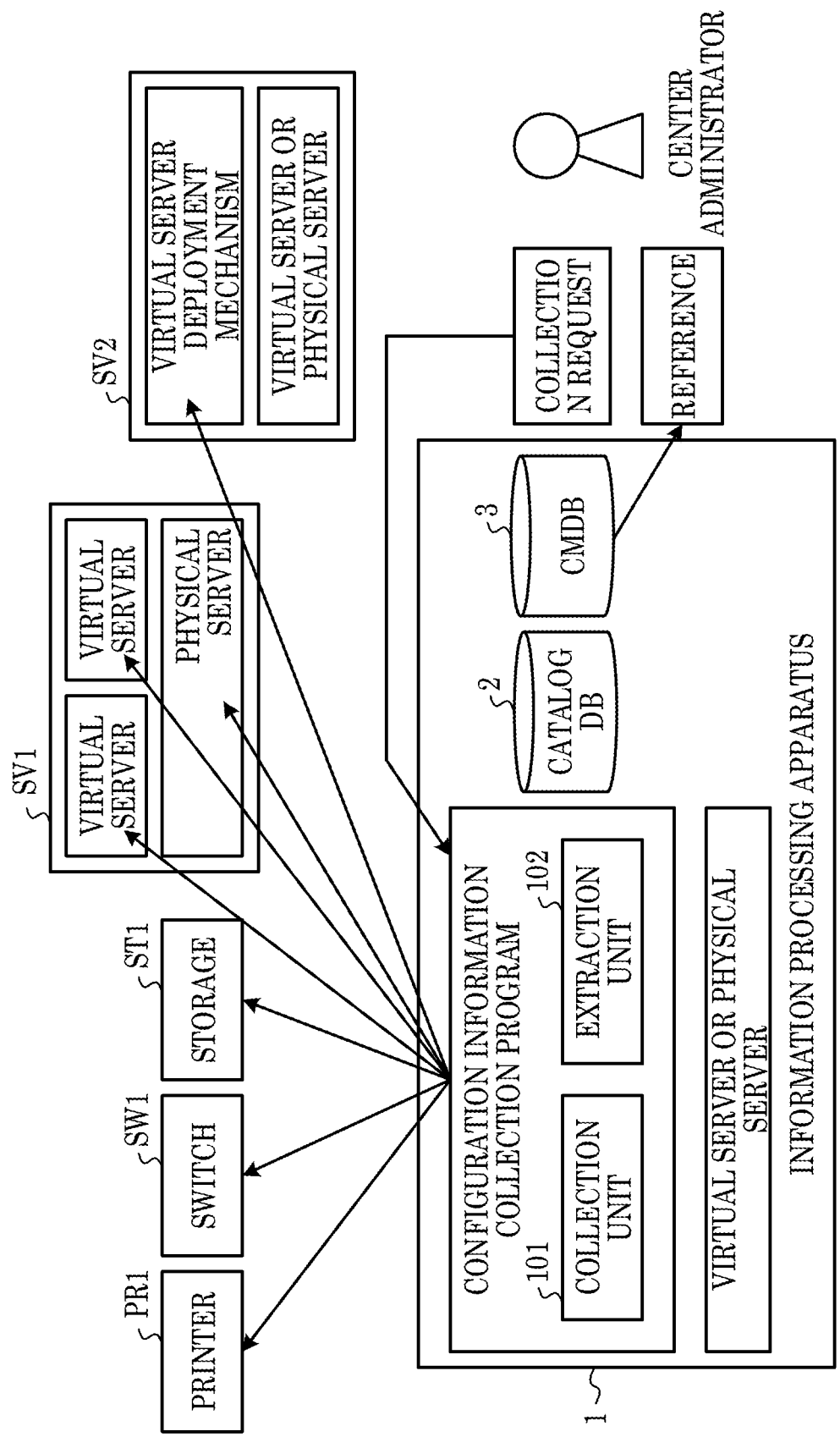
FIG. 1 is a diagram illustrating the configuration of an information system according to an embodiment and a data flow.

In information system configuration management in the related art, information used to manage the configuration of an information system is usually collected through a procedure standardized by, for example, simple network management protocol (SNMP) or intelligent platform management interface (IPMI). Although SNMP, IPMI, and the like establish a procedure for giving and receiving information, there is no standard that defines the type of information collected through the procedure or an information storing method in detail. Accordingly, even if information is collected through the procedure standardized by SNMP, IPMI, or the like, details of a method of managing the collected information (a storage location and a storage format) vary from vendor to vendor or model to model. In an information system including a plurality of types of information processing apparatuses and information apparatuses provided by a plurality of manufacturers and vendors, it is therefore usually difficult to automatically extract information used to manage the configuration of the information system from collected information.

An information processing apparatus 1 according to an embodiment will be described below with reference to the accompanying drawings. Nowadays, in information systems, a plurality of types of computers (hereinafter also referred to as servers), information apparatuses (hereinafter also referred to as resources), and the like provided by a plurality of manufacturers and vendors are sometimes used in combination. In such an information system, it is often difficult to automatically and accurately extract configuration information used to manage the configuration of the information system. In this embodiment, configuration information of an information apparatus includes, for example, information specifying a piece of hardware included in the information apparatus, information about hardware characteristics, and a value set for the piece of hardware. The information specifying a piece of hardware is, for example, a product name, a serial number, or a media access control (MAC) address. The value set for the piece of hardware is, for example, an Internet protocol (IP) address. In this embodiment, configuration information including one or a plurality of items is extracted for a single resource. It can be said that the item is a constituent of the configuration information.

With the recent progress of virtualization, the ratio between virtual servers and physical servers becomes N:1. In such an information system, it is difficult to uniquely associate the configuration information of a virtual server with the configuration information of a physical server. The relationship between pieces of configuration information is therefore manually analyzed and managed for such an information system. Accordingly, it takes a long time to perform configuration management for the information system.

In the following embodiment, an exemplary information processing method will be described with which the accuracy of managing and analyzing pieces of information acquired from an information system by the information processing apparatus 1 can be improved and reliable configuration information can be automatically extracted. Exemplary processing of the information processing apparatus 1 will be described for automatically extracting information to be used for configuration management from pieces of information acquired from respective resources through a procedure standardized by SNMP, IPMI, or the like.

In the information processing apparatus 1, collation information used to extract configuration information is set in advance and is registered in a database. The collation information includes a portion called keyword and a portion called pattern. The collation information is also referred to as retrieval code. The information processing apparatus 1 automatically extracts each item of configuration information by searching pieces of information collected from an information system for information matching a keyword and a pattern defined in advance. The following configuration according to an embodiment is illustrative, and the configuration of the information processing apparatus 1 is not limited to the configuration according to an embodiment.

[Embodiment]

FIG. 1 is a diagram illustrating the configuration of an information system according to an embodiment and a data flow. This information system includes the information processing apparatus 1 for managing the information system and servers SV1 and SV2, a printer PR1, a switch SW1, and a storage ST1 which are management targets of the information processing apparatus 1. These management targets illustrated in FIG. 1 are illustrative, and an information apparatus from which information can be collected through a procedure standardized by SNMP, IPMI, or the like becomes a management target. In addition, the number of management targets is not limited. The number of servers may be three or more including the servers SV1 and SV2. The number of printers may be two or more including the printer PR1, the number of switches may be two or more including the switch SW1, and the number of storages may be two or more including the storage ST1.

In the example illustrated in FIG. 1, the server SV1 includes a physical server and virtual servers constructed on the physical server. The server SV2 is a virtual server or a physical server, and has a virtual server deployment mechanism for providing a virtual server for a user in a cloud environment. The virtual server deployment mechanism constructs, for example, an application program designated by a user and a virtual server used to execute the application program and provides them for the user. The virtual server deployment mechanism transmits information about the relationship between a physical serve in the information system and a virtual server constructed on the physical server in response to a query from the information processing apparatus 1.

The switch SW1 is, for example, a Layer 2 (L2) switch or a Layer 3 (L3) switch. The storage ST1 is, for example, a network attached storage (NAS). For example, in an information apparatus such as the server SV1, the server SV2, the printer PR1, the switch SW1, or the storage ST1 (hereinafter referred to simply as information apparatus), a central processing unit (CPU) executes an agent program corresponding to SNMP, acquires information about a management target, and provides the acquired information for the information processing apparatus 1. In each information apparatus, an IPMI agent program is executed to collect hardware information.

The information processing apparatus 1 collects pieces of information acquired from respective resources. In the information processing apparatus 1, a CPU executes a configuration information collection program and performs configuration information collection as a collection unit 101. The information processing apparatus 1 performing processing in accordance with a program is hereinafter also referred to simply as a program performing processing. For example, the configuration information collection program collects pieces of information acquired from respective resources by performing processing of a manager program for SNMP, IPMI, or the like. The configuration information collection program extracts configuration information of each resource from the collected pieces of information.

The information processing apparatus 1 may be a virtual server or a physical server. A center administrator accesses the information processing apparatus 1 from, for example, a personal computer or a terminal of the administrator to request the information processing apparatus 1 to perform information collection. The center administrator accesses the information processing apparatus 1 from, for example, a personal computer or a terminal of the center administrator to refer to collected information. The information processing apparatus 1 may be not a server but a personal computer or the like used by a center administrator. That is, the information processing apparatus 1 and a terminal used by a center administrator may be integrated.

As illustrated in FIG. 1, the information processing apparatus 1 includes a catalog database (catalog DB 2) and a configuration management database (CMDB 3). The catalog DB 2 is a database in which collation information used to extract configuration information from pieces of information collected in accordance with SNMP or the like is registered. The information processing apparatus 1 detects information matching collation information registered in the catalog DB 2 as an item of configuration information. In this embodiment, collation information includes a keyword corresponding to a fixed part and a pattern corresponding to a variable part. The catalog DB 2 is an example of a collation information storage unit.

For each item (for example: model name), a keyword (for example: a character string representing a manufacturer name or a model name: ABC COMPUTER) and a pattern (for example: a character string including a regular expression representing a model number: SV\d{3} S\d{1}) are defined in advance in the catalog DB 2. A character string \d{k} is a regular expression representing a k digit number. For example, character strings ranging from SV000 to SV999 matches SV\d{3} and character strings ranging from SV0 to SV9 matches S\d{1}. A keyword and a pattern are examples of collation information corresponding to an item of configuration information used to manage the configuration of an information apparatus. A keyword is an example of a common information part that is common among items of a plurality of pieces of configuration information. A pattern is an example of a non-common information part that is non-common among items of a plurality of pieces of configuration information. A conditional expression represented by a regular expression of this pattern is an example of a matching condition for matching a plurality of pieces of non-common information part.

That is, in the information processing apparatus 1, a CPU executes, as an extraction unit 102, matching upon pieces of information collected in accordance with SNMP, IPMI, or the like using the keyword and the pattern defined in advance to automatically extract configuration information to be used for configuration management. More specifically, for each item in the catalog DB 2, the configuration information collection program searches the pieces of information collected in accordance with IPMI and SNMP based on the keyword and determines whether a character string in a hit part matches the pattern. If there are a plurality of hits, the configuration information collection program tentatively selects the first hit and records it in the CMDB 3.

The catalog DB 2 also stores detection results of items of the configuration information matching the registered collation information and a result of totalization of the number of times of detection. The larger the number of times of detection of items of the configuration information matching the collation information, the better the collation information. The configuration information collection program stores, for each model, the number of times of detection in the catalog DB 2 each time pieces of information are collected from each resource, selects, for each model, collation information having a large number of times of detection, and reviews (rewrites) an item in the CMDB 3. The configuration information collection program finally stores a part of the collected pieces of information matching the collation information having a large number of times of detection in the CMDB 3 as an item of the configuration information.

The CMDB 3 is a database in which extracted configuration information is stored. Of detected items matching the collation information registered in the catalog DB 2, an item that has not been discarded is stored in the CMDB 3. That is, of detected items of configuration information matching the collation information, an item having the largest number of times of detection is stored in the CMDB 3. Detected items of configuration information matching the collation information which have small number of times of detection are discarded as noise.

The information processing apparatus 1 detects configuration information using the collation information stored in the catalog DB 2 in accordance with the configuration information collection program and also collects information about the relationship between a virtual server and the ID of a physical server that is a deployment destination from the virtual server deployment mechanism in the server SV2. The information processing apparatus 1 stores the collected relationship information in the CMDB 3.

Figure 2:
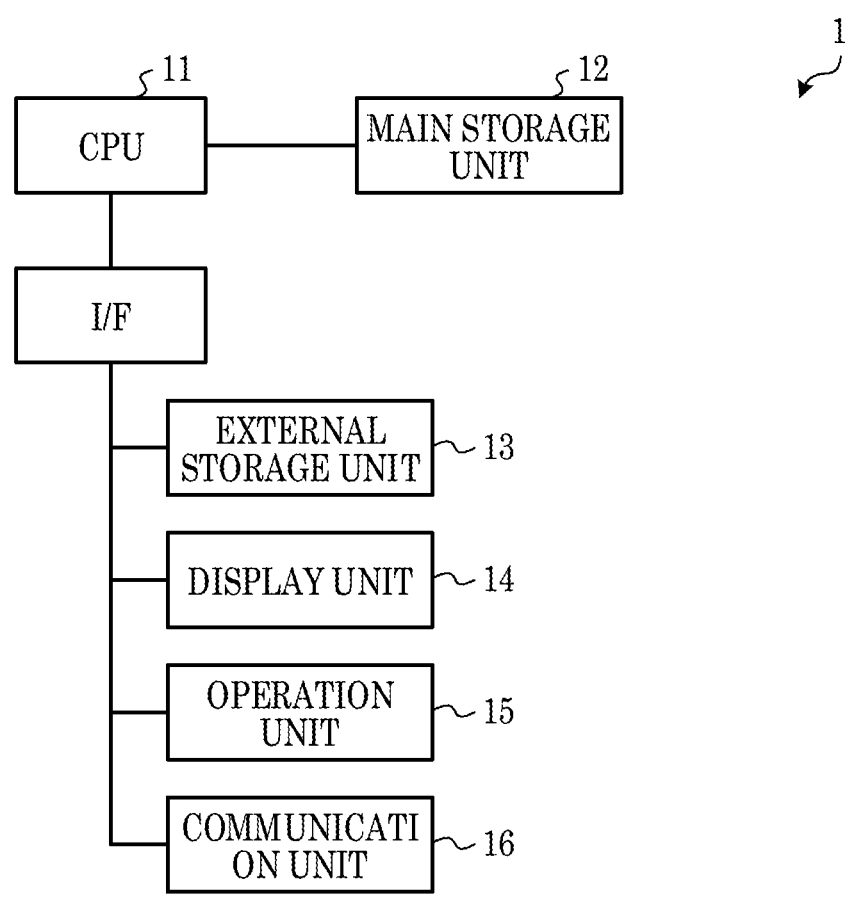
FIG. 2 is a diagram illustrating the hardware configuration of an information processing apparatus.

FIG. 2 is a diagram illustrating a hardware configuration of the information processing apparatus 1. This information processing apparatus includes a CPU 11, a main storage unit 12, and external devices connected to the CPU 11 via an interface (I/F), and executes information processing in accordance with a program. The external devices may be exemplified by an external storage unit 13, a display unit 14, an operation unit 15, and a communication unit 16.

The CPU 11 executes a computer program deployed in an executable manner on the main storage unit 12, thereby providing functions of the information processing apparatus 1. The main storage unit 12 stores the computer program to be executed by the CPU 11, data to be processed by the CPU 11, and the like. The main storage unit 12 is, for example, a dynamic random access memory (DRAM), a static random access memory (SRAM), or a read-only memory (ROM). The external storage unit 13, for example, is used as a storage device for assisting the main storage unit 12, and stores the computer program to be executed by the CPU 11, the data to be processed by the CPU 11, and the like. The external storage unit 13 is, for example, a hard disk drive, a solid state disk (SSD), or the like. The information processing apparatus 1 may be provided with a driver for a removable storage medium. The removable storage medium is, for example, a Blu-ray disc, a digital versatile disk (DVD), a compact disc (CD), or a flash memory card.

The information processing apparatus 1 includes the display unit 14, the operation unit 15 and the communication unit 16. The display unit 14 is, for example, a liquid crystal display or an electroluminescence panel. The operation unit 15 is, for example, a keyboard or a pointing device. In this embodiment, the pointing device is exemplified by a mouse. The communication unit 16 transmits and receives data to and from other devices on a network. For example, the CPU 11 acquires information from, for example, the server SV1 via the communication unit 16 through a procedure defined by SNMP, IPMI, or the like.

As described above, the CPU 11 in the information processing apparatus 1 executes the configuration information collection program to perform processing as, for example, the collection unit 101 and the extraction unit 102. The CPU 11 is also called a microprocessor (MPU) or a processor. The CPU 11 is not limited to a single processor and may have a multiprocessor configuration. Alternatively, a single CPU that is connected via a single socket may have a multicore configuration. At least a part of processing of, for example, the collection unit 101 and the extraction unit 102 may be performed by a processor other than the CPU, such as a dedicated processor like a digital signal processor (DSP), a graphics processing unit (GPU), a numerical data processor, a vector processor, or an image processor. At least a part of processing of each of the above-described units may be performed by an integrated circuit (IC) or any other digital circuit. Each of the above-described units may include an analog circuit. Examples of the integrated circuit include an LSI, an application specific integrated circuit (ASIC), and a programmable logic device (PLD). Examples of the PLD include a field-programmable gate array (FPGA). Each of the above-described units may be a combination of a processor and an integrated circuit. Such a combination is called, for example, a microcontroller (MCU), a system-on-a-chip (SoC), a system LSI, a chip set, or the like.

Figure 3:
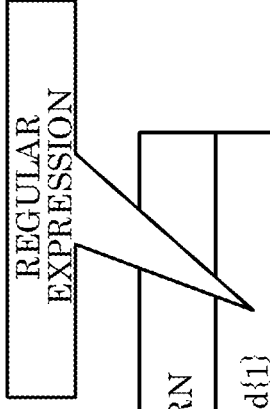
FIG. 3 is a diagram illustrating data in a collation information table defined in a catalog DB.

FIG. 3 is a diagram illustrating data in a collation information table defined in the catalog DB 2. The collation information table defines collation information, that is, a keyword and a pattern. In the collation information table, each row defines collation information, that is, a pair of a keyword and a pattern. Each row in the collation information table has columns of a definition ID, an item, a keyword, and a pattern.

The definition ID is information used to uniquely identify collation information in the collation information table. The definition ID is, for example, the serial number of a row in the collation information table. The item is an item to be detected with collation information in each row, that is, an element of configuration information. Examples of the item include "model name", "IP address" "MAC address" and "serial number". However, the item is not limited to them and any information that is obtainable in accordance with SNMP, IPMI, or the like may be an item.

The keyword is a character string in the fixed part of collation information. The keyword is information that is common among a plurality of items. On the other hand, a pattern is a definition expression defining the variable part of collation information using a regular expression. A pattern is information a part of which is non-common among a plurality of items. A definition expression defined as a pattern, for example, a regular expression, is an example representing a matching condition.

A pattern is defined like this: RX\d{3}S\d{1} where RX\d{3}S\d{1} represents alphanumeric characters between RX000S0 and RX999S9 since \d{k} represents k numbers. In this pattern, "RX" and "S" are common among a plurality of items and \d{3} and \d{1} represents a non-common (variable) part. Since \d{1,3} represents 1 to 3 numbers, it represents a number between 1 and 999. A regular expression according to this embodiment is not limited to an example illustrated in FIG. 3. For example, an asterisk ("*") representing an arbitrary character string and a sharp ("#") representing an arbitrary character may be used.

FIG. 4 is a diagram illustrating an example of a detection result table stored in the catalog DB 2. A detection result table records, for each resource (information apparatus or the like), the value of an item of configuration information detected with collation information having a definition ID in the collation information table. The value is a character string in actually collected information corresponding to a detected item. As illustrated in the drawing, each row in the detection result table stores a single detected value. That is, the detection result table records and stores items detected in accordance with the configuration information collection program.

Each row has columns of a resource ID, a definition ID, and a value. The resource ID is information used to uniquely identify each resource, that is, each information apparatus or the like. The resource ID is given to each of information apparatuses such as the servers SV1 and SV2, the printer PR1, the switch SW1, and the storage ST1. The definition ID is the definition ID of collation information (see FIG. 3). The value is a detected value. The value is, for example, a character string representing a model name such as RX300S2 corresponding to the definition ID=1. The value is, for example, an IP address such as 192.168.1.1 corresponding to the definition ID=3. Since the detection result table stores detected values in respective rows, the information processing apparatus 1 can totalize the number of times of detection of a value for each model and each definition ID of collation information using the detection result table. That is, the information processing apparatus 1 specifies the model of an information apparatus based on a resource ID (the ID of the information apparatus) in the detection result table and totalize the number of times of detection for each model.

FIG. 5 is a diagram illustrating a detection count table stored in the catalog DB 2. The detection count table stores a total value acquired by totalizing the number of occurrences of a definition ID for each model using the detection result table. That is, the detection count table stores, for each model, the number of times of detection of a value corresponding to each definition ID. Each row in the detection count table has a model definition ID, a definition ID, and a detection count.

The model definition ID is identification information used to uniquely specify the model of each resource, that is, each information apparatus. The format of an item of configuration information depends on a model. In this embodiment, the information processing apparatus 1 therefore totalizes the number of times of detection for each model so as to learn the characteristics of an item (value) of configuration information for each model. By this learning, the information processing apparatus 1 specifies a keyword and a pattern having a large number of times of detection for each model and extracts more accurate configuration information with no noise for each model. The definition ID has been described with reference to FIG. 3. The detection count is the number of times an item (value) of configuration information has been detected with a corresponding definition ID in a corresponding model.

FIG. 6 is a diagram illustrating a server relationship table in the CMDB 3. The server relationship table stores a pair of the resource ID of a physical server and the resource ID of a virtual server (virtual server resource ID) constructed on the physical server. As described with reference to FIG. 1, the information processing apparatus 1 acquires the relationship between a physical server resource ID and a virtual server resource ID from the virtual server deployment mechanism in the information system. Using the server relationship table, a virtual server constructed on each physical server is grasped.

FIG. 7 is a diagram illustrating a configuration information table in the CMDB 3. The configuration information table stores extracted configuration information with no noise. As described above, configuration information is created for each resource (information apparatus or the like) and includes information specifying a piece of hardware included in an information apparatus or a value set for the piece of hardware. Each row in the configuration information table corresponds to configuration information of a single resource (information apparatus or the like). As illustrated in the drawing, each row in the configuration information table has items such as a resource ID, a model name, an IP address, and a serial number. It is noted that items of configuration information are not limited to the examples illustrated in FIG. 7.

The resource ID is an ID specifying a resource such as an information apparatus. The model name is the product model name of a corresponding resource, that is, a corresponding information apparatus. The IP address is an IP address given to a corresponding resource. The serial number is a product serial number given to a corresponding resource. FIG. 7 illustrates a case where items of configuration information include as least one of the network address of an information apparatus and the serial number of the information apparatus.

Figure 8:
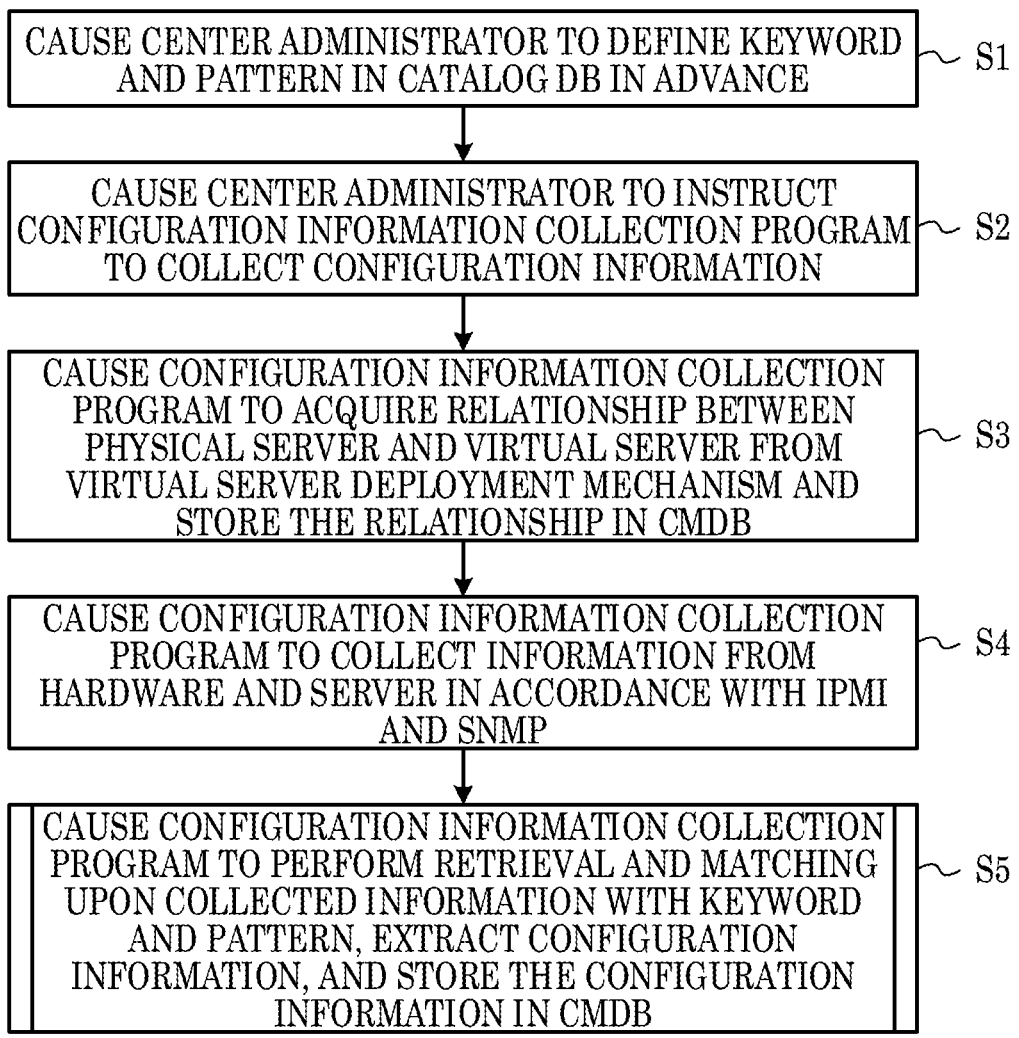
FIG. 8 is a diagram illustrating a configuration information collection process performed in an information processing apparatus.

FIG. 8 is a diagram illustrating a configuration information collection process performed in the information processing apparatus 1. The CPU 11 in the information processing apparatus 1 performs the process illustrated in FIG. 8 in accordance with a computer program deployed in an executable manner on the storage unit 12. A process illustrated in FIG. 8 and the subsequent drawings will be described as a process performed by the information processing apparatus 1.

First, in this process, a center administrator defines a keyword and a pattern in the catalog DB 2 in advance. Upon the acceptance of the input from the center administrator, the information processing apparatus 1 defines the keyword and the pattern in the catalog DB 2 (S1). Subsequently, the center administrator instructs the configuration information collection program to collect configuration information. The information processing apparatus 1 receives the instruction from the center administrator (S2).

Subsequently, the information processing apparatus 1 acquires the relationship between a physical server and a virtual server from the virtual server deployment mechanism in accordance with the configuration information collection program and stores the relationship in the CMDB 3 (S3). Subsequently, the information processing apparatus 1 collects information from each information apparatus (a piece of hardware, a server, and the like) in accordance with IPMI and SNMP (S4). The information processing apparatus 1 performs retrieval and matching upon collected information using the keyword and the pattern, extracts configuration information, and stores the configuration information in the CMDB 3 (S5).

Figure 9:
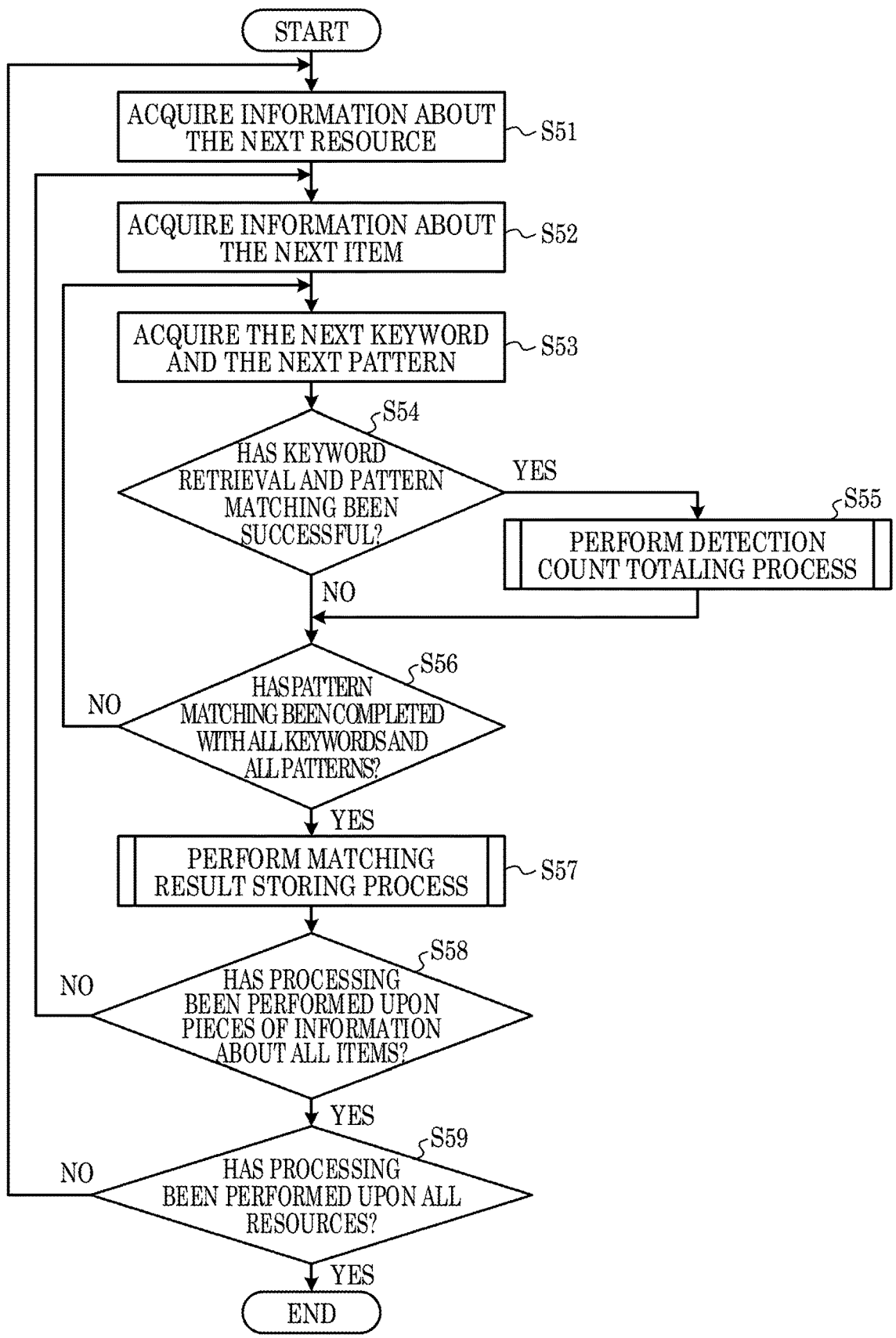
FIG. 9 is a diagram illustrating in detail a process of performing retrieval and matching upon collected information using a keyword and a pattern, extracting configuration information, and storing the configuration information in the CMDB.

FIG. 9 is a diagram illustrating in detail a process of performing retrieval and matching upon collected information with a keyword and a pattern, extracting configuration information, and storing the configuration information in the CMDB 3 (S5 in FIG. 8). In this process, the information processing apparatus 1 performs a loop for respective pieces of resource information, a loop for respective items, and a loop for respective keywords and respective patterns. First, the information processing apparatus 1 acquires pieces of information collected by the next resource (information apparatus) (S51). The information processing apparatus 1 acquires information about the next item from the pieces of information collected by the resource (S52). The information about the next item is information separated in a predetermined manner among the pieces of information acquired in S51 (the pieces of information collected by the resource being processed). The information separated in a predetermined manner is an item defined by SNMP and IPMI, and an object in the case of SNMP. That is, the information processing apparatus 1 processes pieces of information collected in accordance with SNMP on an object-by-object basis. The information processing apparatus 1 processes pieces of information collected in accordance with IPMI on an item-by-item basis.

Furthermore, the information processing apparatus 1 acquires the next keyword and the next pattern from the collation information table (S53). The information processing apparatus 1 performs retrieval with the keyword, performs matching with the pattern, and determines whether information about the item being processed match the keyword and the pattern (S54). The processing of S54 is an example of collating information acquired from an information system including a plurality of types of information apparatuses with collation information.

In a case where the item matches the keyword and the pattern, the information processing apparatus 1 performs the detection count totaling process (S55). The information processing apparatus 1 determines whether pattern matching has been completed with all keywords and all patterns (S56). In a case where there is a keyword and a pattern which have yet to be collated with information about an item, the process returns to S53 in which the information processing apparatus 1 performs processing upon the next keyword and the next pattern. On the other hand, in a case where pattern matching has been completed with all keywords and all patterns, the matching result storing process is performed (S57). The processing of S54 and S57 is an example of extracting a part of the acquired information which includes a portion matching the common information part of the collation information and a portion other than the matching portion satisfying a matching condition of the non-common information part.

The information processing apparatus 1 determines whether processing has been performed upon pieces of information about all items (S58). In a case where there is information about an item upon which processing has yet to be completed, the process returns to S52 in which the information processing apparatus 1 performs processing upon information about the next item. In a case where processing has been performed upon the pieces of information about all items, the information processing apparatus 1 determines whether processing has been performed upon all information apparatuses included in the information system (S59). In a case where there is a resource upon which processing has yet to be performed, the process returns to S51 in which the information processing apparatus 1 performs processes upon the next resource. In a case where the information processing apparatus 1 has performed upon all resources included in the information system, the process illustrated in FIG. 9 ends.

Figure 10:
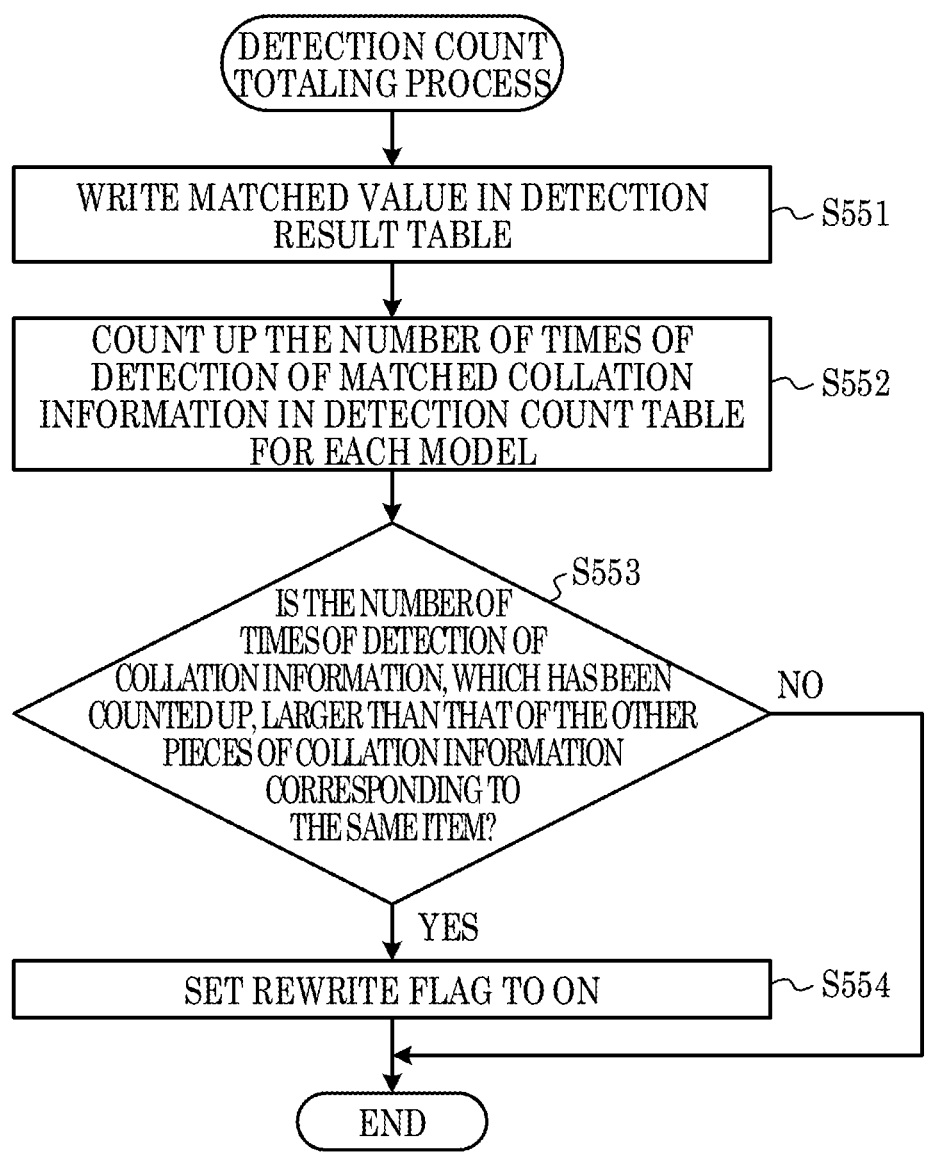
FIG. 10 is a diagram illustrating in detail a detection count totaling process.

FIG. 10 is a diagram illustrating in detail the detection count totaling process (S55 in FIG. 9). In this process, the information processing apparatus 1 writes a matched value in the detection result table (S551). Subsequently, the information processing apparatus 1 counts up the number of times of detection of matched collation information (a definition ID specifying a keyword and a pattern) in the detection count table for each model (S552). The processing of S552 is an example of totalizing the number of successes of collation for each information apparatus model and each piece of collation information.

Furthermore, the information processing apparatus 1 determines whether the number of times of detection of the collation information, which has been counted up, is larger than that of the other pieces of collation information corresponding to the same item (S553). As illustrated in FIG. 5, the number of times of detection is counted for each model definition ID and each definition ID. As illustrated in FIG. 3, the definition ID is an ID identifying each of all pieces of collation information in the collation information table. On the other hand, as illustrated in FIG. 3, a plurality of definition IDs correspond to the same item of configuration information. For example, in the example illustrated in FIG. 3, definition IDs=1 and 2 define the item "model name" of collation information, definition IDs=3 to 5 define the item "IP address" of collation information, and definition IDs=6 and 7 define the item "serial number" of collation information. Accordingly, "the other pieces of collation information corresponding to the same item" in S553 represents, for example, "the other pieces of collation information corresponding to the item of IP address". In a case where the number of times of detection that has been counted up is larger than that of the other pieces of collation information corresponding to the same item, the information processing apparatus 1 sets a rewrite flag to ON (S554).

Figure 11:
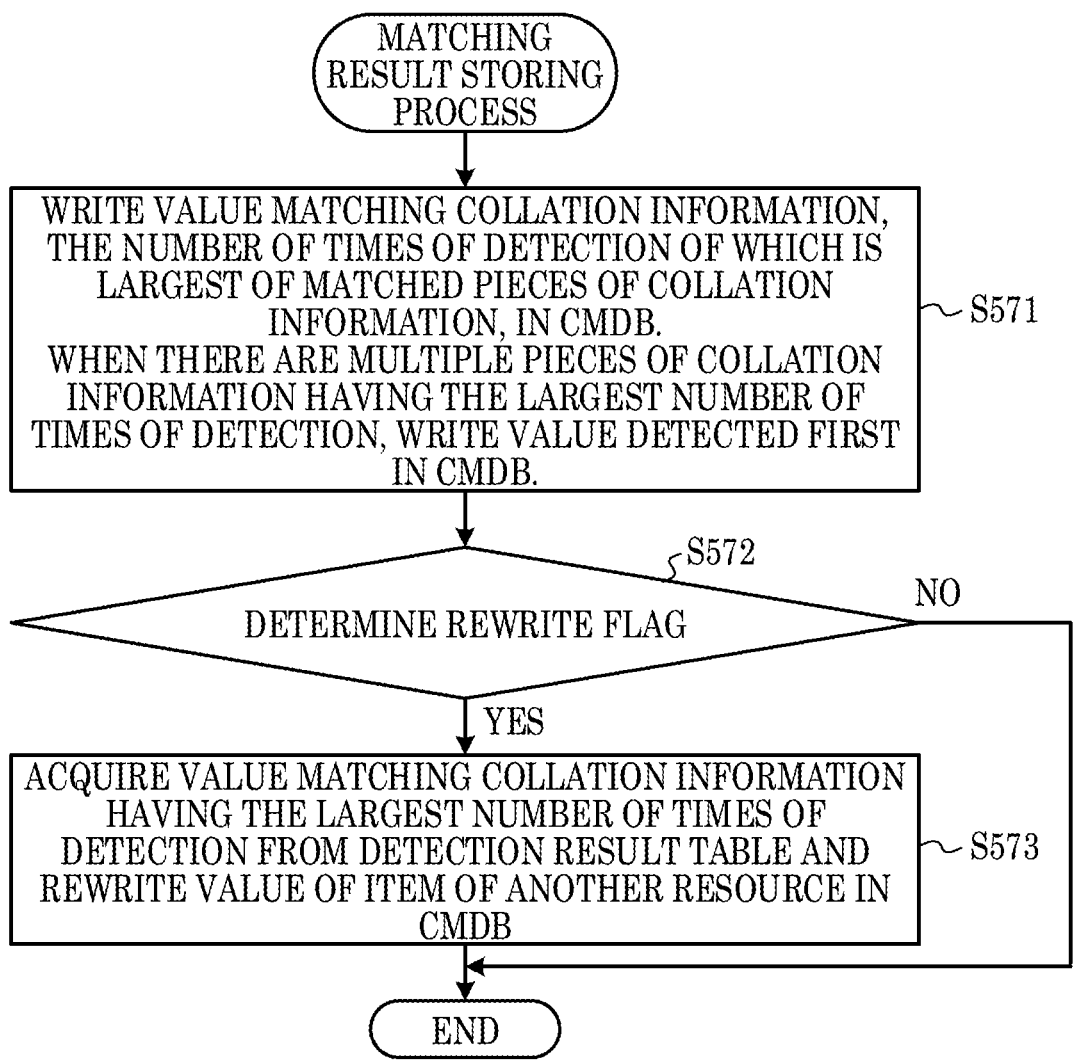
FIG. 11 is a diagram illustrating in detail a matching result storing process.

FIG. 11 is a diagram illustrating in detail the matching result storing process (S57 in FIG. 9). In this process, the information processing apparatus 1 writes a value (a part of information acquired as a collation successful result) matching collation information, the number of times of detection of which is largest of matched pieces of collation information, in the CMDB 3. In a case where there are a plurality of pieces of collation information having the largest number of times of detection, the information processing apparatus 1 writes a value detected first in the CMDB 3 (S571). Subsequently, the information processing apparatus 1 determines the rewrite flag (S572). In a case where the rewrite flag is ON, the information processing apparatus 1 acquires a value matching collation information having the largest number of times of detection from the detection result table and rewrites the value of an item of another resource (a piece of hardware, a server, an information apparatus, or the like) in the CMDB 3 (S573). The processing of S571 is an example of preferentially extracting, from a plurality of successful results of the collation of the same item, a collation successful result acquired with collation information with which a large number of successes of collation are acquired as the item of configuration information. The processing of S571 is an example of temporarily extracting a collation successful result as the item of configuration information until the totalization of the number of times of detection is completed for pieces of information acquired from all information apparatuses in the information system. In a case where the rewrite flag is ON in S572, a change in the result of totalization of the number of successes of collation has occurred. The processing of S573 is an example of preferentially determining a collation successful result acquired with collation information with which a large number of successes of collation are acquired as the item of configuration information.

Figure 12:
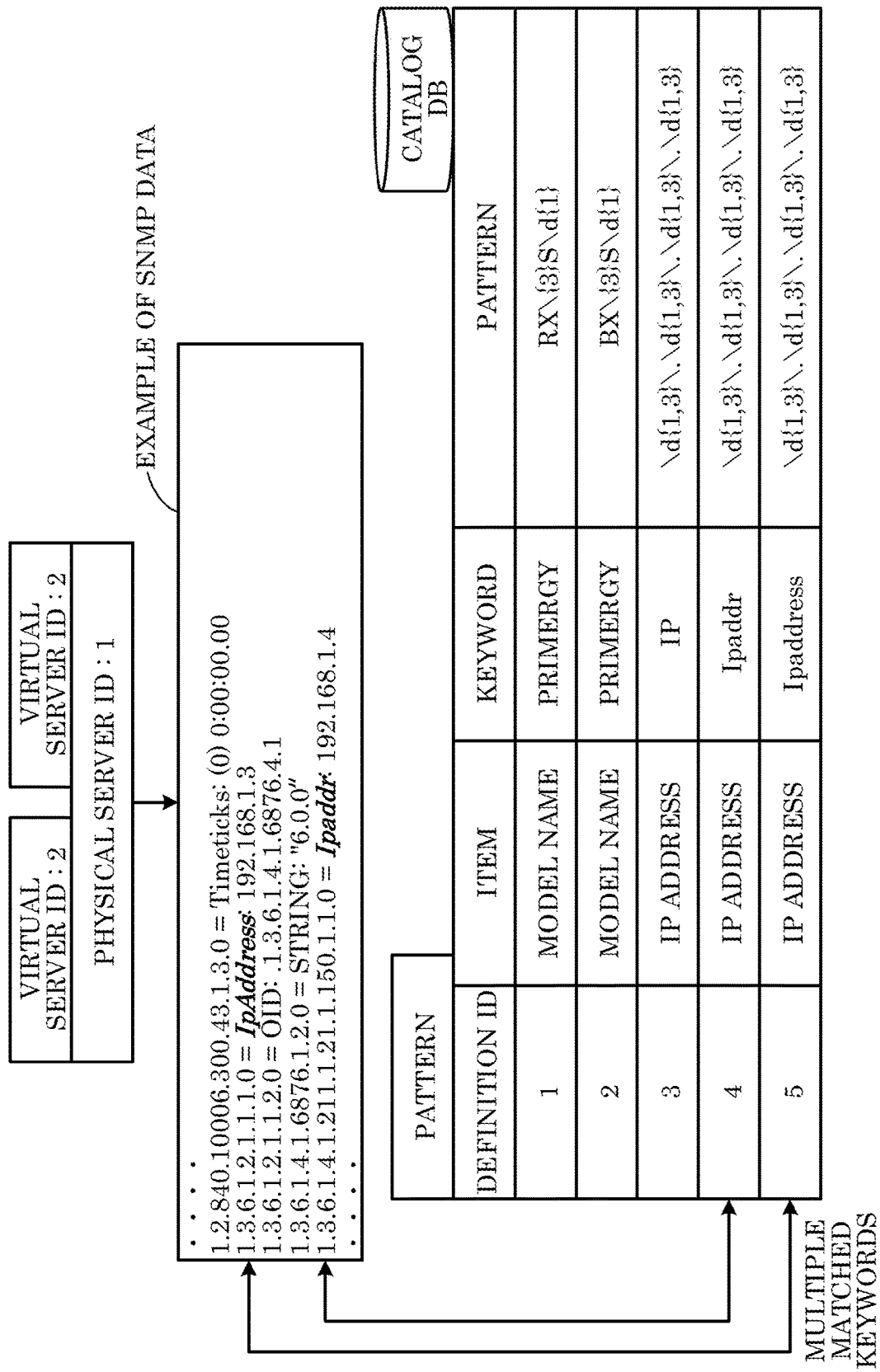
FIG. 12 is a diagram illustrating a process performed by an information processing apparatus that is a comparative example.

FIG. 12 is a diagram illustrating a process performed by an information processing apparatus that is a comparative example. In this exemplary process, a keyword and a pattern are registered in a catalog DB in advance and an item "IP address" is acquired from data acquired in accordance with SNMP. As illustrated in the drawing, a keyword "ipaddr" corresponding to a definition ID "4" and a keyword "ipaddress" corresponding to a definition ID "5" are registered in a catalog DB that is a comparative example. In a case where data acquired in accordance with SNMP includes a character string matching the keyword "ipaddr" and a character string matching the keyword "ipaddress", an information processing apparatus that is a comparative example is unable to determine which of them is correct. Such a problem arises not only in a case where there are different keywords but also in a case where there are different patterns. On the other hand, in an embodiment, the problem that occurs in the comparative example can be solved because collation information having a large number of matching times is preferentially used to extract an item.

As described above, in this embodiment, the information processing apparatus 1 can automatically extract configuration information to be used for configuration management from pieces of data collected through a procedure standardized by SNMP, IPMI, or the like. There is a case where an enormous amount of data is collected in accordance with IPMI or SNMP, and details of the storage location and storage format of collected information is not standardized. The acquisition of configuration information from collected information is manually performed and takes much time.

The information processing apparatus 1 according to this embodiment defines in advance pieces of collation information each including a keyword and a pattern using pieces of information published by respective vendors of information apparatuses and general terms. The information processing apparatus 1 performs keyword retrieval and pattern matching using the defined pieces of collation information and records collation information with which keyword retrieval and pattern matching have been successful and a value that is a collation successful result. The information processing apparatus 1 temporarily stores a value that is a successful result of the retrieval and the matching in the CMDB 3 as a temporary item (candidate). The information processing apparatus 1 records the number of times of detection at the time of the retrieval and the matching for each information apparatus model and each definition ID. The information processing apparatus 1 preferentially employs an extraction result acquired with collation information having a large number of times of detection as an item. The information processing apparatus 1 therefore can remove information having a small number of times of detection which may be noise and extract reliable information as an item of configuration information.

In this process, the value temporarily stored in the CMDB 3 at the time of the retrieval is rewritten by a matched value retrieved by collation information having a large number of times of detection. The information processing apparatus 1 can automatically extract information for configuration management through the above-described procedure when completing retrieval performed upon pieces of information acquired from all information apparatuses in the information system.

In this embodiment, the catalog DB 2 stores a keyword corresponding to the fixed part of an item and a pattern including a regular expression corresponding to the variable part of the item as collation information. The information processing apparatus 1 performs retrieval upon collected pieces of information using the keyword and acquires information matching the pattern as an item. Thus, since the information processing apparatus 1 narrows the pieces of information using the keyword and extracts the information matching the pattern, it can efficiently process the collected pieces of information. In particular, a pair of a keyword and a pattern has good compatibility with a product model name, a model number, or the like.

In this embodiment, since the information processing apparatus 1 totalizes the number of times a keyword in collation information has been retrieved and a pattern in the collation information has been matched, it can quantitatively determine reliability of an item extracted with the collation information. Since the totalization is performed for each resource model from which information has been collected, the information processing apparatus 1 can learn the characteristics of setting of an item, for example, a method of setting a model name, for each resource model, that is, each information apparatus model. As a result, the information processing apparatus 1 can perform the extraction of an item using collation information suitable for the characteristics of each model.

Items of configuration information include the IP address, MAC address, and the like of an information apparatus on a network and the serial number of the information apparatus. The information processing apparatus 1 therefore can automatically extract and manage the hardware configuration of the information system, a value set for a piece of hardware, and the like.

[Modification of Embodiment]

In this embodiment, the CPU 11 in the information processing apparatus 1 executes the configuration information collection program as the collection unit 101 and the extraction unit 102. However, the configuration of the information processing apparatus 1 according to this embodiment is not limited to such a configuration. For example, the collection unit 101 may be included in another computer (for example, an information collection server) and the extraction unit 102 may be included in the information processing apparatus 1. For example, the extraction unit 102 in the information processing apparatus 1 may extract an item of configuration information from pieces of information which the information collection server has acquired and collected from resources in an information system in accordance with SNMP, IPMI, and the like.

In the above-described embodiment, as illustrated in FIG. 9, the matching result storing process (S57) is performed after pattern matching has been completed with all keywords and all patterns (YES in S56). However, the information processing apparatus 1 does not necessarily have to perform such a procedure. In the process illustrated in FIG. 9, the detection result table has a capacity for storing pieces of information detected by the time pattern matching has been completed with all keywords and all patterns. On the other hand, in the process illustrated in FIG. 9, the rewrite flag determination processing (S572) and the item rewrite processing (S573) are performed at a relatively high frequency in the matching result storing process (S57). In a case where the capacity of the detection result table can have a capacity larger than the capacity for the process illustrated in FIG. 9, the matching result storing process (S57) may be performed after processing has been performed upon pieces of information about all items (YES in S58) or processing has been performed upon all resources (YES in S59). Although the capacity of the detection result table increases, this change can reduce the number of times of execution of the item rewrite processing (S573).

<Computer Readable Recording Medium>

A program making a computer, other machines and apparatuses (hereinafter referred to as the computer and other equivalent apparatuses) attain any one of the above-described functions, can be recorded on a recording medium readable by the computer and other equivalent apparatuses. The computer and other equivalent apparatuses are made to read and execute the program on this recording medium, whereby the function can be provided.

The above-described recording medium readable by the computer and other equivalent apparatuses is a recording medium capable of storing information such as data and a program by an electric, magnetic, optical, mechanical, or chemical operation and allowing the stored information to be read from the computer and other equivalent apparatuses. Of such recording media, those detachable from the computer and other equivalent apparatuses include, for example, a flexible disk, a magneto-optical disk, a CD-ROM, a CD-R/W, a DVD, a Blu-ray Disc, a DAT, an 8-mm tape, and a memory card such as a flash-memory card. Of such recording media, those fixed to the computer and other equivalent apparatuses include a hard disk and a read-only memory (ROM). A solid state drive (SSD) can be used as a recoding medium which is detachable from the computer and other equivalent apparatuses or which is fixed to the computer and other equivalent apparatuses.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
a memory; and
a processor coupled to the memory and the processor configured to:
receive a plurality of pieces of collation information corresponding to respective information items of configuration information representing information apparatus configurations,
perform collation processing for collating information acquired from an information system including a plurality of information apparatuses with the plurality of pieces of collation information, and
specify pieces of configuration information representing respective configurations of the plurality of information apparatuses based on specific collation information with which the largest number of successes of the collation processing for each type of information item and each model of information apparatus is detected,
the collation processing includes performing a loop for each of resource information of the configuration information, a loop for each of items of the configuration information, and a loop for each of keywords and patterns of the keywords of the configuration information.

2. The information processing apparatus according to claim 1,
wherein each of the plurality of pieces of collation information has a common information part corresponding to common information that is common among the respective pieces of configuration information of the plurality of information apparatuses and a non-common information part corresponding to pieces of non-common information that are unique to the respective pieces of configuration information of the plurality of information apparatuses, and the non-common information part includes a matching condition representing a matching range, and
wherein the collation processing includes performing collation to determine whether the information acquired from the information system matches the common information part of each of the plurality of pieces of collation information and satisfies the matching condition.

3. The information processing apparatus according to claim 1, wherein the collation processing includes specifying temporary specific collation information based on collation successful results before completion of the collation processing performed on the information acquired from the plurality of information apparatuses in the information system and changing the temporary specific collation information when a change in a totalization result of the number of successes of the collation processing occurs.

4. The information processing apparatus according to claim 1, wherein the information items of the configuration information include at least one of a network address and a serial number of the information apparatus.

5. The information processing apparatus according to claim 1, wherein the information acquired from the information system is information acquired in accordance with Simple Network Management Protocol or Intelligent Platform Management Interface.

6. An information processing method executed by a computer, the method comprising:
receiving a plurality of pieces of collation information corresponding to respective information items of configuration information representing information apparatus configurations;

performing collation processing for collating information acquired from an information system including a plurality of information apparatuses with the plurality of pieces of collation information; and specifying pieces of configuration information representing respective configurations of the plurality of information apparatuses based on specific collation information with which the largest number of successes of the collation processing for each type of information item and each model of information apparatus is detected, the collation processing includes performing a loop for each of resource information of the configuration information, a loop for each of items of the configuration information, and a loop for each of keywords and patterns of the keywords of the configuration information.

7. The information processing method according to claim 6, wherein each of the plurality of pieces of collation information has a common information part corresponding to common information that is common among the respective pieces of configuration information of the plurality of information apparatuses and a non-common information part corresponding to pieces of non-common information that are unique to the respective pieces of configuration information of the plurality of information apparatuses, and the non-common information part includes a matching condition representing a matching range, and wherein the collation processing includes performing collation to determine whether the information acquired from the information system matches the common information part of each of the plurality of pieces of collation information and satisfies the matching condition.

8. The information processing method according to claim 6, wherein the collation processing includes specifying temporary specific collation information based on collation successful results before completion of the collation processing performed on the information acquired from the plurality of information apparatuses in the information system and changing the temporary specific collation information when a change in a totalization result of the number of successes of the collation processing occurs.

9. The information processing method according to claim 6, wherein items of the configuration information include at least one of a network address and a serial number of the information apparatus.

10. The information processing method according to claim 6, wherein the information acquired from the information system is information acquired in accordance with Simple Network Management Protocol or Intelligent Platform Management Interface.

11. A non-transitory computer-readable medium storing a program that causes a computer to execute a process comprising:

receiving a plurality of pieces of collation information corresponding to respective information items of configuration information representing information apparatus configurations;

performing collation processing for collating information acquired from an information system including a plurality of information apparatuses with the plurality of pieces of collation information; and specifying pieces of configuration information representing respective configurations of the plurality of information apparatuses based on specific collation information with which the largest number of successes of the collation processing for each type of information item and each model of information apparatus is detected, the collation processing includes performing a loop for each of resource information of the configuration information, a loop for each of items of the configuration information, and a loop for each of keywords and patterns of the keywords of the configuration information.

* * * * *